(No Model.)

G. N. SCEETS.
BRAKE BEAM.

No. 448,929. Patented Mar. 24, 1891.

Witnesses
Geo. W. Young
Jno. L. Condon

Inventor
George N. Sceets
By H. G. Underwood
Attorney

UNITED STATES PATENT OFFICE.

GEORGE N. SCEETS, OF MILWAUKEE, WISCONSIN.

BRAKE-BEAM.

SPECIFICATION forming part of Letters Patent No. 448,929, dated March 24, 1891.

Application filed October 17, 1890. Serial No. 368,444. (No model.)

*To all whom it may concern:*

Be it known that I, GEORGE N. SCEETS, a citizen of the United States, and a resident of Milwaukee, in the county of Milwaukee, and in the State of Wisconsin, have invented certain new and useful Improvements in Brake-Beams; and I do hereby declare that the following is a full, clear, and exact description thereof.

My invention relates to brake-beams for railway-cars; and the invention consists in certain peculiar and novel features of construction and arrangement, as hereinafter described and claimed.

Figure 1:
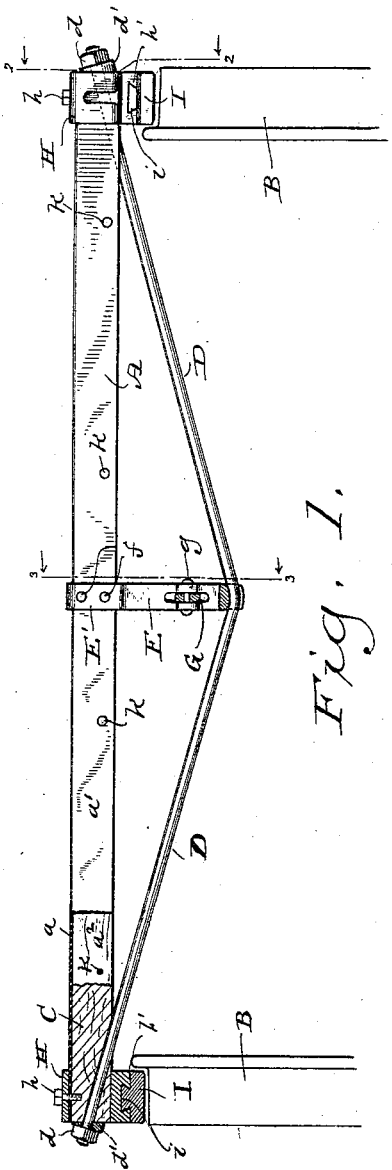
Figure 2:
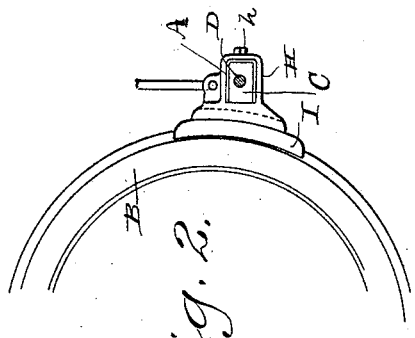
Figure 3:
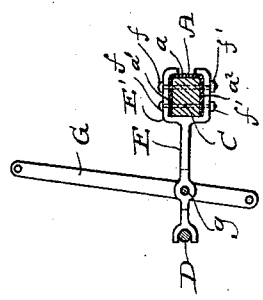
Figure 4:
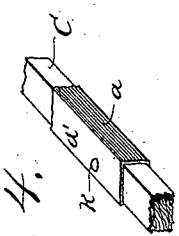

In the accompanying drawings, Figure 1 is a plan view of a brake-beam constructed in accordance with my invention, the beam being shown as partly broken away at one end. Fig. 2 is a sectional view of the same on the line 2 2 of Fig. 1. Fig. 3 is a similar view of the same on the line 3 3 of Fig. 1. Fig. 4 is a detached perspective view of a portion of the brake-beam.

The object of my invention is to produce a composite brake-beam which shall combine strength and durability, and which shall also be inexpensive in construction. This result I attain by virtue of the construction which I will now proceed to describe.

In the said drawings, A designates the outer portion of the brake-beam, said portion being substantially of U form, having three closed sides $a\ a'\ a^2$, and being open opposite to the side $a$. This outer portion corresponds approximately in length with the spaces between the threads of the wheels B and is provided with a wooden filler C. This filler is formed of one piece of wood, preferably of oak, and is inclosed longitudinally within the sides $a'\ a^2$ and the back $a$ of the outer portion A. In order to stiffen the brake-beam against working strains, I provide a metal V-truss D, the ends of which pass obliquely through the ends of the filling coincident with the open side of the outer portion A of the brake-beam, the extremities of said brace protruding beyond the ends of the wooden filler C and being externally screw-threaded to receive nuts $d$, between which and the adjacent ends of the filling are placed washers $d'$.

A brace E is interposed between the bend at the middle of the truss D and the middle of the brake-beam, and the opposite end of this brace from that which is in contact with the truss is of U form, as at E', to embrace the outer portion A of the brake-beam. This U-shaped end of the brace is preferably secured to the brake-beam by bolts $f$, which pass through the outer portion A and filling C of the brake-beam, and which are retained in position by nuts $f'$.

The usual brake-lever G is preferably pivoted upon the brace E, as shown at $g$, and each end of the brake-beam is surrounded by a collar H, held in position by a set-screw $h$ and preferably grooved, as shown at $h'$, to receive the tongue $i$ of the brake-shoe I.

The outer portion A of the brake-beam is preferably secured to the inner portion C by bolts $k$ passing laterally through the sides $a'$ $a^2$ of the outer portion A and also through the filling C.

From the above description it will be seen that the brake-beam is durable and inexpensive in construction, and that it combines the qualities of brake-beams made only of wood or metal, while materially excelling such in wearing qualities and ease of repair.

Having thus described my invention, what I claim as new therein, and desire to secure by Letters Patent, is—

1. An improved brake-beam comprising an outer portion consisting of a three-sided open-ended sheet of metal, in combination with a continuous wood filler formed of a single piece and held to the outer portion by a series of bolts passing transversely through the opposite sides of the outer portion and the interposed filling, substantially as set forth.

2. An improved brake-beam consisting of a three-sided open-ended metallic sheet, in combination with a continuous wood filler formed of a single piece, a series of bolts passing transversely through the opposite sides of said metallic sheet and through the wood filler, a central brace secured to and projecting from the said brake-beam, and a truss bearing against said brace and having its ends passed through the uncovered side and ends of the said wood filler and secured by nuts, substantially as set forth.

In testimony that I claim the foregoing I have hereunto set my hand at Milwaukee, in the county of Milwaukee and State of Wisconsin, in the presence of two witnesses.

GEORGE N. SCEETS.

Witnesses:
H. G. UNDERWOOD,
WM. KLUG.